(12) United States Patent
Kushnirsky et al.

(10) Patent No.: US 10,601,591 B2
(45) Date of Patent: Mar. 24, 2020

(54) CLOSE PROXIMITY INNER CIRCLE DISCOVERY

(71) Applicant: MICROSOFT TECHNOLOGY LICENSING, LLC, Redmond, WA (US)

(72) Inventors: Alona Kushnirsky, Herzliya (IL); Haim Somech, Herzliya (IL); Oded Nahir, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 15/415,714

(22) Filed: Jan. 25, 2017

(65) Prior Publication Data

US 2018/0212773 A1 Jul. 26, 2018

(51) Int. Cl.
| | |
|---|---|
| H04L 9/32 | (2006.01) |
| H04L 9/08 | (2006.01) |
| H04W 12/04 | (2009.01) |
| H04W 8/00 | (2009.01) |
| H04W 4/80 | (2018.01) |

(Continued)

(52) U.S. Cl.
CPC ............ *H04L 9/321* (2013.01); *H04L 9/0833* (2013.01); *H04L 9/0891* (2013.01); *H04L 63/0492* (2013.01); *H04L 63/065* (2013.01); *H04W 4/80* (2018.02); *H04W 8/005* (2013.01); *H04W 12/04* (2013.01); *H04W 48/16* (2013.01); *H04L 2209/805* (2013.01)

(58) Field of Classification Search
CPC ..... H04L 9/321; H04L 9/0833; H04L 9/0891; H04L 2209/805; H04L 2209/80; H04W 12/04; H04W 72/005; H04W 4/008; H04W 8/005; H04W 48/10
See application file for complete search history.

(56) References Cited

U.S. PATENT DOCUMENTS

| 6,553,236 B1 | 4/2003 | Dunko et al. |
|---|---|---|
| 7,035,618 B2 | 4/2006 | Schnurr |

(Continued)

OTHER PUBLICATIONS

P. Papadimitratos et al., "Secure neighborhood discovery: a fundamental element for mobile ad hoc networking," in IEEE Communications Magazine, vol. 46, No. 2, pp. 132-139, Feb. 2008. (Year: 2008).*

(Continued)

*Primary Examiner* — Jung W Kim
*Assistant Examiner* — Sameera Wickramasuriya
(74) *Attorney, Agent, or Firm* — Shook, Hardy & Bacon LLP (57) ABSTRACT

Systems, methods, and computer-readable storage media are provided for enabling discovery of a user by a member of an inner circle of the member when the user is in close proximity to the member. An indication is received from a user device indicating members of an inner circle of the user. A private key is sent to the mobile devices of each member of the inner circle. When the user device broadcasts an encrypted identifier, member devices with the private key can decrypt the encrypted identifier, allowing the member to discover that the user is in close proximity. The user can also update membership of the inner circle so that only members presently in the inner circle can discover that the user is in close proximity.

20 Claims, 5 Drawing Sheets

(51) Int. Cl.
    *H04W 48/16*  (2009.01)
    *H04L 29/06*  (2006.01)

(56) References Cited

U.S. PATENT DOCUMENTS

| | | | | |
|---|---|---|---|---|
| 8,126,157 | B2* | 2/2012 | Buil | G06F 21/10 |
| | | | | 380/270 |
| 9,160,786 | B1 | 10/2015 | Jackson | |
| 9,774,656 | B1* | 9/2017 | Jackson | H04L 67/06 |
| 2006/0161657 | A1* | 7/2006 | Gupta | H04L 29/12009 |
| | | | | 709/224 |
| 2007/0030824 | A1 | 2/2007 | Ribaudo et al. | |
| 2009/0164459 | A1* | 6/2009 | Jennings | H04W 4/02 |
| 2010/0250135 | A1* | 9/2010 | Li | H04W 8/005 |
| | | | | 701/300 |
| 2010/0279713 | A1 | 11/2010 | Dicke | |
| 2011/0238755 | A1* | 9/2011 | Khan | H04W 4/21 |
| | | | | 709/204 |
| 2012/0021684 | A1* | 1/2012 | Schultz | H04B 5/0043 |
| | | | | 455/41.1 |
| 2013/0050262 | A1 | 2/2013 | Jeon | |
| 2013/0282438 | A1* | 10/2013 | Hunter | G01S 1/02 |
| | | | | 705/7.32 |
| 2014/0133656 | A1* | 5/2014 | Wurster | H04L 9/0637 |
| | | | | 380/270 |
| 2014/0222685 | A1* | 8/2014 | Middleton | G06Q 30/0261 |
| | | | | 705/50 |
| 2014/0357267 | A1 | 12/2014 | Carranza et al. | |
| 2014/0362728 | A1* | 12/2014 | Krochmal | H04B 7/26 |
| | | | | 370/254 |
| 2014/0370879 | A1* | 12/2014 | Redding | H04M 3/42178 |
| | | | | 455/419 |
| 2016/0044006 | A1* | 2/2016 | Luft | H04W 36/22 |
| | | | | 380/270 |
| 2016/0227371 | A1* | 8/2016 | Wang | H04W 4/023 |
| 2016/0358186 | A1* | 12/2016 | Radocchia | H04W 76/14 |
| | | | | 455/411 |
| 2016/0373929 | A1* | 12/2016 | Stirling | H04W 4/021 |
| 2016/0381543 | A1* | 12/2016 | Zhang | H04W 76/14 |
| | | | | 455/411 |
| 2017/0048659 | A1* | 2/2017 | Silvestri | H04W 4/08 |
| 2017/0171725 | A1* | 6/2017 | Toth | H04W 4/08 |

OTHER PUBLICATIONS

Zou, Kingsley J., et al. "Proximity discovery for device-to-device communications over a cellular network." IEEE Communications Magazine 52.6 (2014): 98-107. (Year: 2014).*

Yang, et al., "E-SmallTalker: A Distributed Mobile System for Social Networking in Physical Proximity", In Proceedings of IEEE 30th International Conference on Distributed Computing Systems, Jun. 21, 2010, pp. 468-477.

Choi, et al., "Secure mutual proximity zone enclosure evaluation", In Proceedings of the 22nd ACM SIGSPATIAL International Conference on Advances in Geographic Information Systems, Nov. 4, 2014, pp. 133-142.

Polakis, et al., "Where's Wally?: Precise User Discovery Attacks in Location Proximity Services", In Proceedings of the 22nd ACM SIGSAC Conference on Computer and Communications Security, Oct. 12, 2015, pp. 817-828.

Muller, et al., "Proximity sensor: privacy-aware location sharing", In Proceedings of the 15th international conference on Human-computer interaction with mobile devices and services, Aug. 27, 2013, pp. 564-569.

Siksnys, et al., "Private and Flexible Proximity Detection in Mobile Social Networks", In Proceedings of Eleventh International Conference on Mobile Data Management, May 23, 2010, pp. 75-84.

Zheng, et al., "An unsupervised learning approach to social circles detection in ego bluetooth proximity network", In Proceedings of the ACM international joint conference on Pervasive and ubiquitous computing, Sep. 8, 2013, pp. 721-724.

* cited by examiner

CLOSE PROXIMITY INNER CIRCLE DISCOVERY

BACKGROUND

A user may wish to notify one or more members of a close network (hereinafter referred to as an "inner circle") when a member or members are in close proximity to the user. However, unless a member perceives that they are in close proximity to the user, the member is unable to discover the user. For example, if the user is in a large crowd or inside a building and visibility between the member and user is obscured, it will be difficult for the member of the inner circle to discover the user. Thus, for a member of the user's inner circle to discover the user when the user is in close proximity to the member, the user must be directly visible to the member or the user and member must otherwise communicate their presence to each other.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, systems, methods, and computer-readable storage media are provided for allowing discovery of a user by members of the user's inner circle that are in close proximity to the user. For example, a broadcasting user can designate other users (e.g., receiving users) and/or devices as members of their inner circle. A private key can be sent from an identification server to the members allowing the members to decrypt an encrypted identifier broadcast from the broadcasting user. If the broadcasting user is in close proximity to the member and is broadcasting an encrypted identifier, the member can receive the broadcast identifier and decrypt the identifier using the private key, allowing the broadcasting user to be discoverable. By broadcasting a short-range encrypted identifier, the broadcasting user can reveal their location to members of their inner circle when the members are in close proximity Since the broadcasting user cannot be discovered without a private key capable of decrypting the user's identifier, a secure way for the broadcasting user to share their location only to members of their inner circle is provided.

Some embodiments further include updating the private key for members of the user's inner circle on a periodic basis or upon demand by the broadcasting user. The updating allows the broadcasting user to maintain and update membership of their inner circle and to further prevent their discovery to receiving users outside of their inner circle.

Embodiments of the present invention further allow for discovery of an owner of an inner circle. A receiving user can be provided private keys for decrypting user identifiers of inner circles to which they belong. When the receiving user receives a broadcast identifier (e.g., broadcast from an owner of an inner circle), a user device belonging to the receiving user can attempt to decrypt the identifier with the private keys. If the identifier is successfully decrypted using one of the keys, the receiving user can be notified that the owner of the inner circle associated with the key is in close proximity to the receiving user.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for allowing discovery of a broadcasting user by members of an inner circle of the broadcasting user that are in close proximity to the broadcasting user. By way of example and not limitation, the broadcasting user can broadcast an encrypted identifier that can be decrypted by a private key provided by an identification server. Successfully decrypting the identifier allows the member to discover the broadcasting user when the broadcasting user is in close proximity to the member.

There currently exist conventional means for a user to share their location and to discover the location of others. For example, a user can provide GPS information or update a web page with their location. However, the conventional means have certain advantages and disadvantages. One limitation, for example, is that it may be difficult for the user to constantly transmit the user's location in real time. By continuously sending location data, a user device (used to transmit the location) can expend a lot of power, which can drain the battery of the device quickly. On the other hand, if the location of the user is not continuously transmitted, a member of the user's inner circle may not know that the user was in close proximity until after the user has left the vicinity of the member. Furthermore, it may be difficult to prevent others that are not in the user's inner circle from discovering the user's location using the conventional means. For example, if a user posts their location on a social media website, anyone with access to the social media website can determine the user's location, even if they are not proximate to the user.

Recently, close proximity radio transmission technologies, including wireless local area network (WLAN), short-range wireless communication technology (e.g., BLUETOOTH®), near field communication (NFC), ZigBee, etc., have been incorporated into user devices (such as smartphones, wearables, tablets, and other portable computing devices), which allow these devices to communicate with other devices in close proximity Devices can be distinguished from one another by providing a unique identifier for each device. However, these identifiers are normally used at a device level and require associating the identifier with a user to enable proximity detection. In some cases, this association takes place at the operating system level and is applied to all consented applications or takes place at an application level.

An identifier can be broadcast using a low energy signal, which allows a user device to continually broadcast the identifier without significantly draining the battery of the user device. For example, a low energy beacon (e.g., a BLUETOOTH low energy beacon) can be used. Another benefit of using a low energy signal beacon, such as a BLUETOOTH low energy beacon, to broadcast the identifier is that it does not require pairing devices or otherwise providing a handshake between devices. However, this allows the identifier to be received by anyone in range of the broadcast. Thus, a user may broadcast their location or proximity to any device within range instead of a selective group of people.

Accordingly, systems, methods, and computer-readable storage media are provided for discovery of the broadcasting user by members of a broadcasting user's inner circle who are in close proximity to the broadcasting user in a safe manner, so that only those members that are in the broadcasting user's inner circle discover the broadcasting user from the broadcasting user's broadcast. In some embodiments, a broadcasting user provides a list of members they wish to include in their inner circle (e.g., members who are allowed to discover when the broadcasting user is in close proximity) to an identification server. The identification server can send a private key to each member (i.e., member devices) of the inner circle so that when they receive an encrypted identifier from the broadcasting user, they are able to decrypt the identifier and discover that the broadcasting user is in close proximity. The broadcasting user can maintain the list and provide rules that determine to whom and when discovery is permitted. Thus, the broadcasting user can configure members of its inner circle to which the broadcasting user may be discoverable, and an identification server can send an appropriate key to the devices of the members of the broadcasting user's inner circle.

Figure 1:
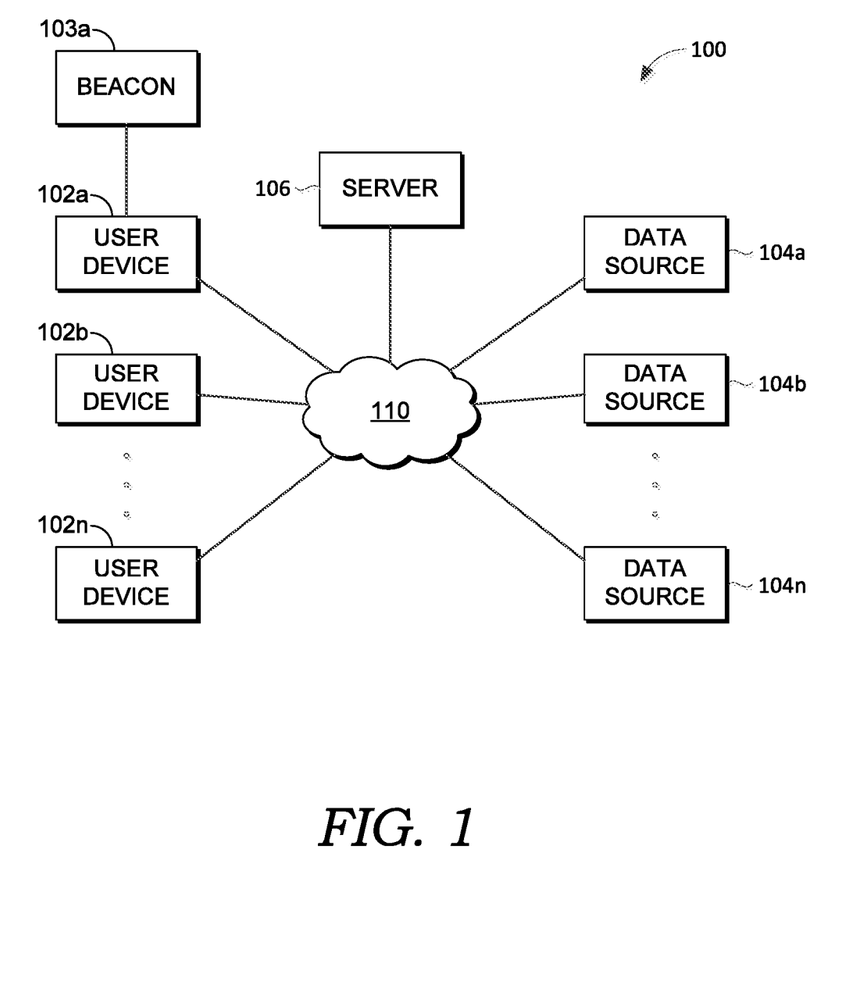
FIG. 1 is a block diagram of an example operating environment suitable for implementations of the present disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; beacon 103*a*; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n*, so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Beacon 103*a* may comprise any type of transmitter configured to broadcast a signal to any one of user devices 102*b* through 102*n*. For example, beacon 103*a* can be a low energy beacon (e.g., a BLUETOOTH low energy beacon) and broadcast a low energy signal (e.g., a BLUETOOTH low energy signal) to user devices 102*b* through 102*n*. Beacon 103*a* can also receive a low energy signal (e.g., a BLUETOOTH low energy signal) broadcasted from another device. It should be understood that although FIG. 1 shows only user device 102*a* comprising beacon 103*a*, this is for illustrative purposes only, and any of user devices 102*b* through 102*n* can also have a beacon.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-inner circle identifier 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106.

It should be understood that user devices 102a and 102b through 102n can be used to broadcast an identifier and/or receive a broadcast identifier. In other words, user devices 102a and 102b through 102n can, in some cases, broadcast an identifier for a broadcasting user and, in other cases, receive a broadcast identifier from a broadcasting user. A user device need not be configured to broadcast an identifier or receive an identifier and can be configured to perform both broadcasting and receiving identifiers.

Figure 2:
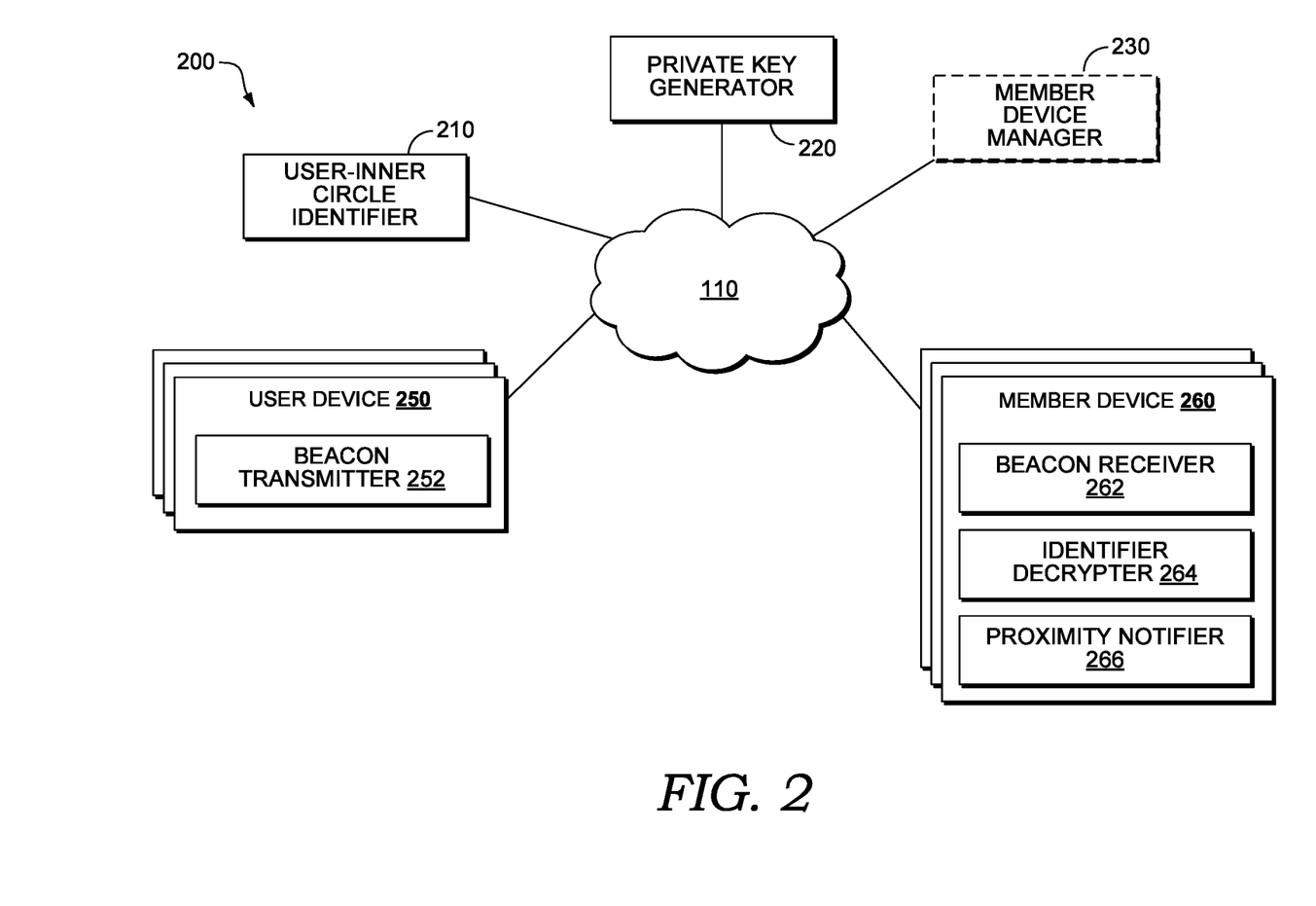
FIG. 2 is a diagram depicting an example computing architecture suitable for implementing aspects of the present disclosure.

Operating environment 100 can be utilized to implement one or more of the components of system 200, described in FIG. 2, including components for broadcasting user identifiers, creating and transmitting private keys, and encrypting and decrypting user identifiers. Operating environment 100 also can be utilized for implementing aspects of methods 300 and 400 in FIGS. 3 and 4, respectively.

Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-inner circle identifier 210, private key generator 220, member device manager 230, one or more user device(s) 250, and one or more member device(s) 260. User-inner circle identifier 210, private key generator 220, member device manager 230, and subcomponents of user device(s) 250 and member device(s) 260 including beacon transmitter 252, beacon receiver 262, identifier decrypter 264, and proximity notifier 266 may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 (including components 210, 220, and 230) may be distributed across a network, including one or more servers (such as server 106) and/or client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-inner circle identifier 210 is generally responsible for identifying members of an inner circle of the broadcasting user. In some embodiments, user-inner circle identifier 210 provides a graphical user interface, e.g., a dashboard, for the broadcasting user to select members of their inner circle. In some embodiments, user-inner circle identifier 210 can also retrieve calendar data for a broadcasting user to determine members to add to an inner circle of the broadcasting user. Furthermore, in some embodiments, a machine learning component (not pictured) can populate a broadcasting user's inner circle based on interactions with other people or activities. It should be understood that the foregoing examples are for illustrative purposes, and other means of populating a broadcasting user's inner circle can also be envisioned. For example, membership of an inner circle can be based on the broadcasting user belonging to a group or organization.

Private key generator 220 generates private keys used to decrypt user identifiers on member device(s) 260. For example, member device(s) 260 can receive a private key generated by private key generator 220. If one of user device(s) 250 broadcasts an encrypted identifier, member device(s) 260 can decrypt the identifier using the private key if member devices(s) 260 belongs to a member of the user's inner circle, as identified by user-inner circle identifier 210.

Member device manager 230 is generally responsible for associating a member to one or more member device(s) 260. Some embodiments of the member device manager 230 determine a device name or identification (device ID) for each device associated with a member. This information about the identified member devices associated with a member may be stored in a profile associated with the member. In some embodiments, a member can modify their profile to register computing devices to which they are associated. The member device manager 230 can also update the user profile to include or exclude computing devices. Thus, the member can configure which device(s) to transmit a private key to in order to decrypt an identifier for the inner circle. Although the member device manager 230 is described as a separate component in FIG. 2, it should be understood that the member device manager 230 can be incorporated in the user-inner circle identifier 210. Thus, instead of identifying members of the user's inner circle, the user-inner circle identifier 210 can identify member devices belonging to the broadcasting user's inner circle.

User device 250 includes beacon transmitter 252. Beacon transmitter 252 broadcasts a user identifier. In some embodiments, this user identifier is encrypted. The user identifier allows other devices that receive the broadcast to discover user device 250. In some embodiments, the identifier is sent via a low energy beacon (e.g., a BLUETOOTH low energy beacon). One advantage of a BLUETOOTH low energy beacon is that the beacon consumes little energy, allowing the identifier to be constantly sent without draining the battery of user device 250. Furthermore, since a BLUETOOTH low energy beacon does not require a handshake, such as a handshake between traditional BLUETOOTH devices, any device can receive the broadcast identifier.

In some embodiments, the data being transmitted from beacon transmitter 252 includes a group identifier. The group identifier need not be encrypted. Thus, a member device 260 receiving the identifier can identify that it belongs to a user's inner circle and can then attempt to decrypt the identifier using the private keys for members of the inner circle. If it does not belong to the user's inner circle, it need not attempt to encrypt the identifier, allowing it to avoid processing the identifier. In some embodiments, the group identifier can cycle so that it is changed at a predetermined frequency. This provides another level of security so that people receiving the broadcast cannot deduce the user from the group identifier.

Member device 260 includes beacon receiver 262, identifier decrypter 264, and proximity notifier 266. Beacon receiver 262 receives any transmitted identifier within range of member device 260. Member device 260 can attempt to decrypt the received identifier using the identifier decrypter 264. The identifier decrypter 264 uses the private key received from the private key generator 220 to decrypt the identifier. In some embodiments, the identifier decrypter 264 has a private key for each inner circle of which it is a member. Thus, the identifier decrypter 264 can attempt to decrypt a received identifier using any of the private keys for each inner circle of which it is a member. If the identifier decrypter 264 successfully decrypts the identifier, proximity notifier 266 notifies the member device that user device 250 is in close proximity to member device 260. For example, proximity notifier 266 can produce an alert notifying the member that the user device is in close proximity.

Although user device 250 and member device 260 are described separately, it should be understood that user device 250 and member device 260 can be the same device. For example, a user device 250 can transmit an identifier to members of the user's inner circle and can receive identifiers from devices of which the user is a member of an inner circle. Furthermore, beacon transmitter 252 and beacon receiver 262 can be the same beacon, such as beacon 103a in FIG. 1.

Figure 3:
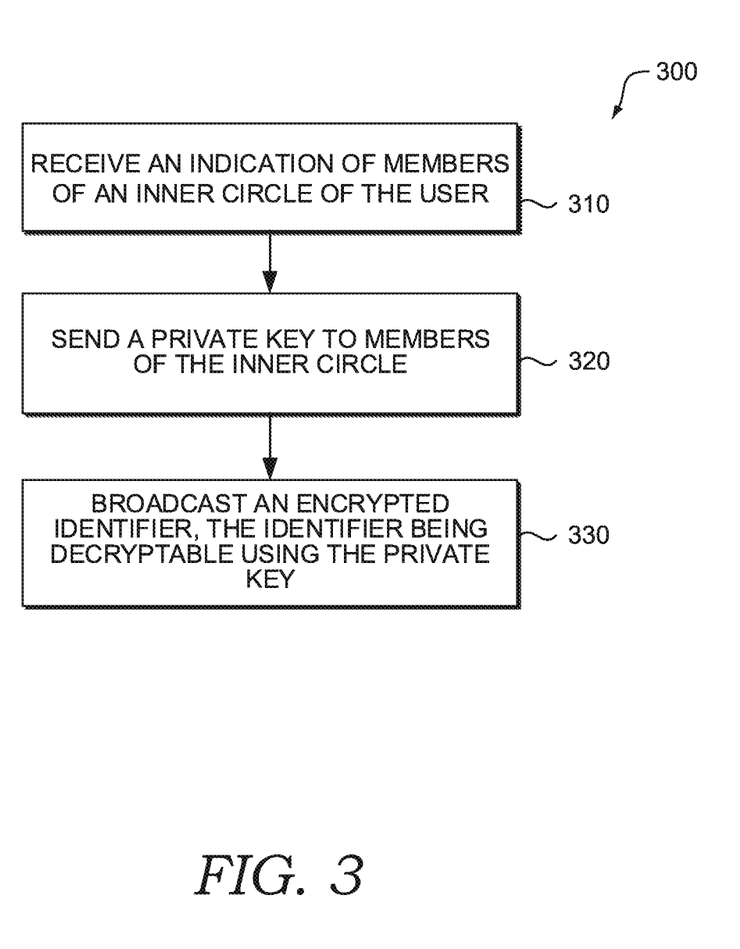
FIGS. 3 and 4 depict flow diagrams of methods for allowing discovery of the broadcasting user to receiving members of an inner circle in close proximity to the broadcasting user, in accordance with embodiments of the present disclosure.

Turning to FIG. 3, a flow diagram is provided illustrating one example method 300 for allowing discovery of a broadcasting user by members of the broadcasting user's inner circle in close proximity to the broadcasting user. In one embodiment, method 300 may be carried out as a cloud-based process or a distributed computing process, using one or more servers or other computing devices. Each block or step of method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 310, an indicator is received by an identification server from a user device that the broadcasting user wishes to share its location with the members of the broadcasting user's inner circle, e.g., an indication of members of an inner circle of the broadcasting user. The members of the inner circle can be configured by the broadcasting user, e.g., via a user device, such as user device 102a in FIG. 1. It should be understood that although one inner circle is described, a broadcasting user could have multiple inner circles. For example, a broadcasting user could have an inner circle during working hours (e.g., an inner circle of co-workers), and an inner circle during off-work hours (e.g., an inner circle of friends). Members of the inner circle may be exclusive to that circle. In embodiments, each inner circle is separately configured. Furthermore, it should be understood that a broadcasting user could have multiple user devices. Each user device can be configured, separately or collectively, to send an indicator to the identification server for an inner circle. In embodiments, a broadcasting user can configure which devices belong to a particular inner circle. For example, a broadcasting user could have a user device for an inner circle including co-workers and another user device for an inner circle including friends.

In some embodiments, an interface is provided for the broadcasting user to configure aspects of the inner circle. For example, members of the inner circle can be identified by the broadcasting user. Furthermore, other configurations are also envisioned. For example, a range could be configured (e.g., how far away the member can be discovered), or a duration for discovery. In some embodiments, further configurations are envisioned via machine learning. For example, if a broadcasting user regularly spends a certain amount of time with a member of their inner circle (e.g., one hour), the discovery can be limited to that amount of time.

At step 320, a private key is sent by the identification server to the members of the broadcasting user's inner circle. A member may have one or more member devices and configure which devices to receive a private key. The private key is associated with the member device so that it cannot be transferred to other devices by the member device. In other words, a member can have more than one private key, each device having their own unique private key. In some embodiments, the key used to encrypt the identifier is different from the key to decrypt the identifier, although the key to decrypt the identifier will be able to decrypt the identifier.

In some embodiments, a member can register its devices with the identification server. Thus, the identification server can send a key to each device of a member of the broadcasting user's inner circle. In some embodiments, the member can also set configurations such as which devices to use for decryption, schedule for the devices, etc. For example, a member can enable decryption on a laptop computing device only during a workday.

In some embodiments, the identification server sends the key via a different channel than the identifier of the broadcasting user. For example, the channel can be public secured or peer to peer. In some embodiments, the key is sent to the member via short message service (SMS) or email.

At step 330, the user device broadcasts an encrypted identifier. Member devices in range of the broadcast can receive the encrypted identifier and attempt to decrypt the encrypted identifier. Since the identifier is encrypted, a device receiving the identifier may not know to whom the identifier belongs unless the device is able to decrypt the identifier. Thus, the user device can prevent discovery of the broadcasting user from people outside of their inner circle. A member device can attempt to decrypt the encrypted identifier using the private key, as described in step 320. In some embodiments, the private key is for use only in decrypting a particular user's encrypted identifier. In other words, the private key cannot decrypt other identifiers.

In some embodiments, the identifier may contain header information in a decrypted portion of the identifier, informing the member device that the identifier is for use in discovering a member of an inner circle, but further information is unavailable unless the identifier is decrypted.

In some embodiments, the private key is cycled periodically. Thus, the private key is only valid for a predetermined duration. For example, a new private key can be transmitted to the user device daily. If a malicious person were able to decrypt a user identifier to discover a proximity of the broadcasting user one day, the malicious person would not be able to decrypt the identifier the next day using the same key. Furthermore, without knowing the seed for the key, the malicious person could not anticipate the key generated by the identification server. Accordingly, the identifier is encrypted with a new key so that the new private key can decrypt the encrypted identifier. In some embodiments, the private key and the user identifier are cycled based on a sensitivity of the broadcasting user. For example, a broadcasting user can select how often they wish the identifier to be changed so that devices with private keys that don't correspond to the present identifier cannot discover the broadcasting user. In some embodiments, the identifier is changed after the occurrence of an event or calendar item. For example, after a meeting has completed, the identifier can be changed so that the broadcasting user is no longer discoverable by other members of the meeting.

In some embodiments, the user device broadcasts the encrypted identifier via a low energy beacon (e.g., a BLUETOOTH low energy beacon). Thus, the user device can broadcast the identifier without requiring a device handshake or some other authorization. Any device that is in close enough proximity of the user device will receive the encrypted identifier, but only those member devices that are in the broadcasting user's inner circle will be able to decrypt the identifier. Thus, only those member devices that are in the broadcasting user's inner circle will discover the user device and determine that the broadcasting user is in close proximity to the member. The low energy beacon can broadcast the encrypted identifier at a regular interval, e.g., every minute. Since the low energy beacon does not require a lot of power, the battery of the user device is preserved. In some embodiments, the identification server transmits the private key via a different channel than the broadcast of the encrypted identifier. Thus, if the user identifier is transmitted via a low energy beacon, the private key can be transmitted via SMS or email. This provides an additional layer of security in that a user attempting to discover the broadcasting user by receiving the broadcast identifier cannot receive the key in the same manner.

In some embodiments, based on the member device decrypting the identifier, a notification is provided on the member device that the user is in close proximity to the member. For example, the mobile device can provide an alert that the broadcasting user is close by. The notification can also cause the member device to perform an action. For example, if all members of the inner circle are in close proximity to the user, it may indicate that all attendees of a meeting are in attendance, and thus, perform an action to start the meeting.

The member receives an encrypted identifier from the broadcasting user. For example, if the broadcasting user is broadcasting their identifier, and the member's mobile device is in range, the member can receive the identifier. Since the identifier is encrypted, someone receiving the identifier may not know to whom the identifier belongs unless the member is able to decrypt the identifier. Thus, the broadcasting user can prevent discovery to people outside of their inner circle. The identifier may contain header information informing the member device that the identifier is for use in discovering a member of an inner circle, but further information is unavailable unless the identifier is decrypted.

In some embodiments, when a broadcasting user updates the members in their inner circle, e.g., the identification server receives an update to the indication of members of the inner circle from the user device, a new identifier is created on the user device. Accordingly, new private keys are created and transferred to the member devices in the updated inner circle. Since the member devices of the updated inner circle have a new private key, the member devices can decrypt the new identifier broadcast from the user device. For devices that are not members of the broadcasting user's inner circle (e.g., when the broadcasting user removes the member device), the old private key will be unable to decrypt the new identifier. Thus, the discovery of a close proximity of the broadcasting user is restricted to those members currently in their inner circle.

Figure 4:
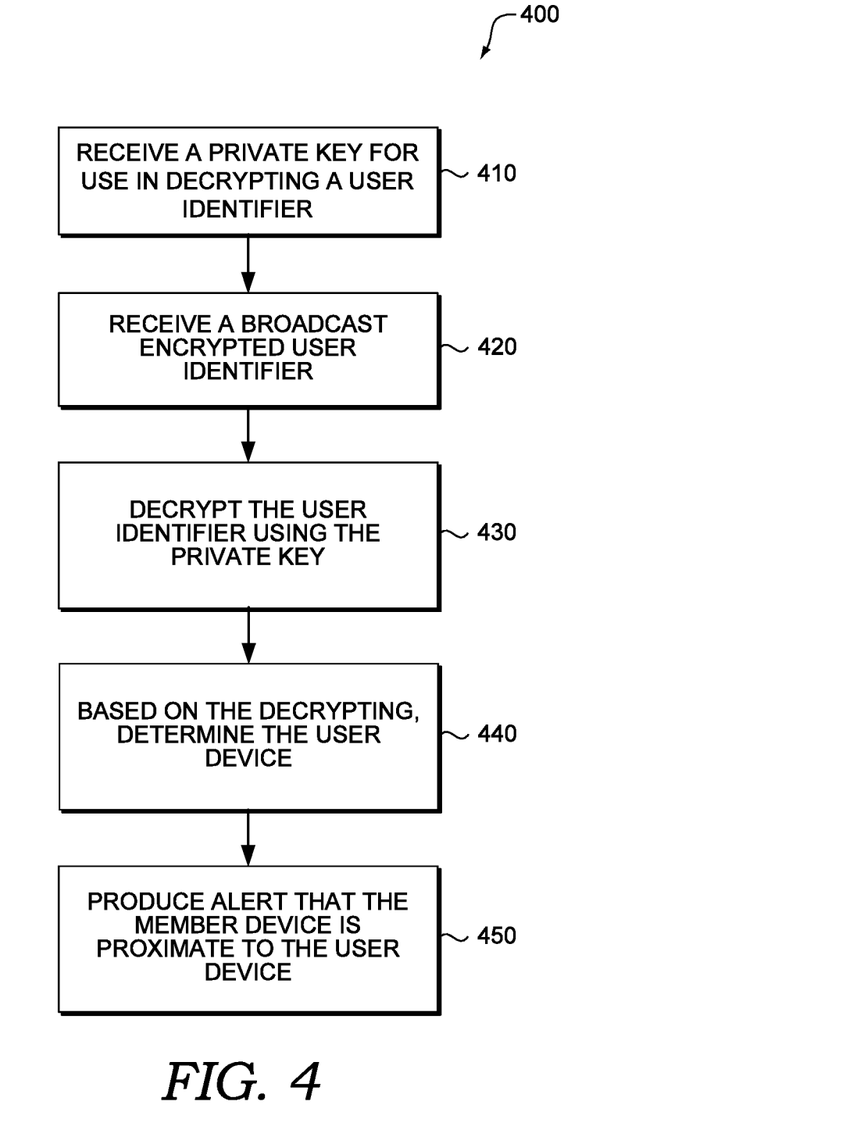

With reference now to FIG. 4, a flow diagram is provided illustrating one example method 400 for allowing discovery of an owner of an inner circle when the receiving user is in close proximity to the owner. In some embodiments, method 400 may be carried out on a computing device such as member device 260 described in FIG. 2.

Accordingly, at step 410, a private key is received by a user device from an identification server. In some embodiments, the private key is received via SMS or email. The private key allows the user device to decrypt an identifier sent by the owner of an inner circle when the receiving user is a member of the owner's inner circle. The receiving user need not have the owner in their inner circle, i.e., the relationship need not be reciprocal.

In some embodiments, the user device is registered at the identification server. In some embodiments, the user device is provided to the owner of the inner circle so that the owner of the inner circle may select the user device for their inner circle. In some embodiments, the receiving user may designate user devices so that an owner selection of the user will enable the private key to be sent to designated user devices. In some embodiments, a receiving user can update their registered user devices (e.g., a replacement phone) and a private key will be generated for the updated device to discover the proximity of the owner of the inner circle to which the private key belongs. This will occur for all inner circles to which the receiving user belongs.

At step 420, an identifier is received by the user device. The identifier is sent by an owner device to all devices in range using a low energy beacon, such as a BLUETOOTH low energy beacon. Although an identifier from the owner device is received, no handshake between devices is performed. Thus, the owner device sends the identifier, regardless of which machine receives the identifier. In embodiments, the identifier is encrypted. Thus, members that do not belong to the owner's inner circle will not be notified that the owner is in close proximity, i.e., the member will just receive an identifier but will not know who or what the identifier is. The identifier sent by the owner device can be constantly sent, e.g., can be sent repeatedly at a regular interval.

At step 430, the private key is used to decrypt the identifier. For example, a user device may contain multiple private keys, e.g., a private key for each inner circle of which the device is a member. Although the receiving user may attempt to decrypt the identifier with each of the private keys, only the private key associated with the inner circle will decrypt the identifier. In some embodiments, the identifier will include a group identifier. Thus, if the receiving user is not part of the group, the user device need not attempt to decrypt the identifier with a key not belonging to the group.

At step 440, the owner of the inner circle is determined to be in close proximity to the receiving user, e.g., member of the inner circle. For example, if the private key is able to successfully decrypt the identifier, the owner of the inner circle (e.g., the sender of the broadcast user identifier) can be determined. In embodiments, the user device determines that an owner of an inner circle is in range of the user device. Furthermore, the decrypted identifier can provide additional information on the owner of the inner circle. For example, the decrypted identifier can include the identity of the owner and a status of the owner.

At step 450, a notification is provided to the receiving user that the user device of the owner of the inner circle is in close proximity to the receiving user, i.e., member device. For example, if the identifier is sent via a BLUETOOTH low energy beacon, the signal may only reach about 10 meters. Thus, a user may be notified that an owner of the inner circle is within 10 meters of the user. In some embodiments, the range of the identifier may be configurable by the owner. For example, if the owner wishes to only transmit the identifier to members that are a short distance from the owner, the owner may set a limit to the range of the broadcast. Thus, a limit may be set to allow notification to those members within a predefined distance. In some embodiments, the notification is based on a user preference. The notification can be a one-time alert or an alert any time an owner of the inner circle to which the receiving user is a member is in close proximity to the receiving user. For example, the notification can be a reminder to talk to a person when they are proximate to the receiving user. It should be understood that the receiving user associated with the user device need not be human and may also include non-human entities. For example, a beacon associated with a location can transmit the identifier and the receiving user can determine that they are in close proximity to the location. Thus, an entity includes both human and non-human entities.

In some embodiments, a flag is also received from the identifier. The flag can indicate, e.g., a status of the owner. For example, if the owner is otherwise busy, the flag can indicate a busy status to the receiving user. In some embodiments, the status flag can be processed by the server and/or user device and prevent notification of the owner as being in close proximity to the receiving user.

In embodiments, a user device is prevented from passing the identifier to another user device. This allows the member identifier to only be shared to members of the inner circle.

In some embodiments, once the receiving user is determined to be in close proximity to the owner, the user device can stop polling for the user identifier. For example, if it is determined that the user has been in close proximity for 15 minutes, further polling of the user identifier can stop since the user device can infer that the broadcasting user in close proximity has been discovered.

Although the signal sent from the user device is described as being encrypted, the identifier need not be encrypted. The owner of the inner circle can send the decrypted identifier to all nearby devices. Although a receiving user may receive the identifier, without knowing that the identifier belongs to the owner, the receiving user may not know whom the identifier is for.

Although it is described that an owner device sends the identifier, the identifier can also be sent from, e.g., other devices of the receiving user. For example, a notebook of the receiving user can send the identifier, and once it is determined that the receiving user is in close proximity to the notebook (via another user device of the receiving user), the notebook can be logged into. Furthermore, the user device can send an identifier to other devices. For example, a user identifier can be used to access a room or grant access when the receiving user is proximate to the device. As another example, the broadcasting user can be a security checkpoint, and decrypting the identifier allows the receiving user to be validated at the security checkpoint.

It should be understood that both the broadcasting user and receiving user can be a non-human entity, e.g., an organization or a location. Thus, the non-human entity can includes devices that broadcast identifiers that can be received by receiving users. Furthermore, a non-human entity can receive a broadcast from a broadcasting user. In other words, a user as used herein can be both a receiving user and a transmitting user.

In some embodiments, the members of the inner circle can be conditional. For example, if a calendar event is scheduled, the member of the calendar event may be in the inner circle for the duration of the calendar event. As another example, if the owner of the inner circle generally spends the same amount of time with a member, that member may be removed from the inner circle for the remainder of the day after the time has elapsed, for example.

In some embodiments, instead of broadcasting the user identifier, a user device can transmits a Globally Unique Identifier (GUID) that is constantly changing (instead of transmitting the actual user identifier). The member device sends a received GUID and its own identifier to the authentication server. If the member device is a member of the user's inner circle, the authentication server can return the actual user identifier, which can be used to discover the broadcasting user. If the member device is not a member of the broadcasting user's inner circle, the authentication server will return nothing and the member device won't discover the broadcasting user.

In some embodiments, a member device may not receive a private key from the identification server. Instead, when a user identifier is received, the member device transmits the user identifier to the identification server. If the member device is a member of the inner circle of the user device, the identification server will send a notification to the member device that the user device is in close proximity Thus, all user identifiers received by the member device are sent to the identification server, but only identifiers for which the member device is in an inner circle will the identification server send a notification of proximity.

In some embodiments, the frequency of the attempts to decrypt the user identifier can be set by a receiving user. In some embodiments, the frequency of the attempts can also be set based on the previous attempts. For example, if a receiving user has successfully decrypted a user identification, although the receiving user continues to receives signals from the beacon, the receiving user may attempt to decrypt user identifiers less frequently. Furthermore, the frequency of the attempts can be determined based on rules. For example, if a receiving user has a meeting, the frequency of attempts may depend on the schedule of the meeting. As another example, if the receiving user frequently meets for a certain duration of time, the attempts may only occur for that period of time.

Accordingly, various aspects of technology directed to systems and methods for discovery of members of a user's inner circle in close proximity to the user are described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

It should be understood, that the terms "user," "member," and "owner" are without limitation and can generally be used interchangeably. For example, a user may be an owner of an inner circle and may be a member of another inner circle. As used herein, a user is generally used to describe the device performing the processing, e.g., the steps of example methods 300 and 400, and in some cases may be called the member and other cases the owner.

Figure 5:
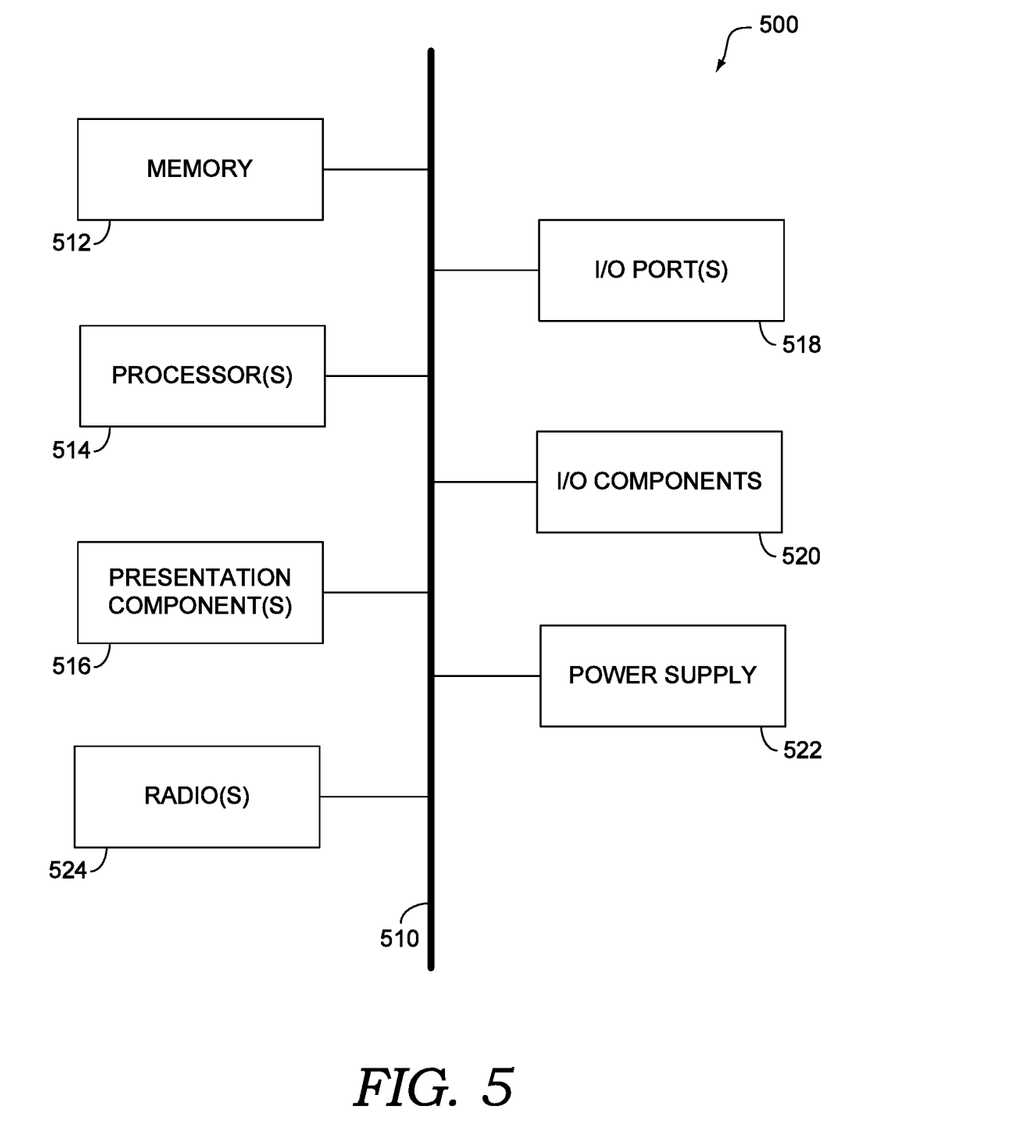
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a BLUETOOTH connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A system comprising: an identification server configured to receive an indication of members of an inner circle of a user; and to transmit a private key to the members of the inner circle, the private key being used to decrypt an encrypted identifier broadcast from a user device to discover a close proximity of the user.

Embodiment 2

The system of embodiment 1, wherein the identification server is further configured to receive an update to the indication of members of the inner circle, the update removing at least one member from the inner circle, and to transmit a new private key to the members of the inner circle, the removed member not receiving the new private key and being unable to discover a proximity of the user.

Embodiment 3

The system of any of embodiments 1-2, wherein the private key is associated with a device identifier of at least one member device for each member of the inner circle.

Embodiment 4

The system of any of embodiments 1-3, wherein the private key is unique to the at least one member device.

Embodiment 5

The system of any of embodiments 1-4, wherein the private key is valid for a predetermined duration, a member being unable to discover a proximity of the user after the predetermined duration using the private key.

Embodiment 6

The system of any of embodiments 1-5, wherein the private key is configured to enable decryption of the encrypted identifier, and cannot decrypt other identifiers.

Embodiment 7

The system of any of embodiments 1-6, wherein the identification server transmits the private key via a different channel than the broadcast of the encrypted identifier.

Embodiment 8

The system of any of embodiments 1-7, wherein the encrypted identifier is broadcast via a low energy beacon, and is broadcast at a regular interval.

Embodiment 9

The system of any of embodiments 1-8, wherein the encrypted identifier is changed after a predetermined duration.

Embodiment 10

The system of any of embodiments 1-9, wherein the predetermined duration is determined based on a sensitivity of the user.

Embodiment 11

The system of any of embodiments 1-10, further comprising: a member device, the member device configured to receive the private key from the identification server and the encrypted identifier from the user, and to decrypt the encrypted identifier using the private key.

Embodiment 12

A system comprising: one or more processors; and computer storage memory having computer-executable instructions stored thereon which, when executed by the processor, implement discovery of a entity by a member of an inner circle of the entity in close proximity to the entity, comprising: receiving a private key from an identification server, the private key for use in decrypting a user identifier; receiving broadcast data indicating that a discoverable device is within a predetermined range of the member device, the data comprising an encrypted user identifier; decrypting the data using the private key; when the data is decrypted using the private key, determining that the data is from a device associated with the entity; and producing an alert that identifies that the member device is proximate to the device associated with the entity.

Embodiment 13

The system of embodiment 12, wherein the data is broadcast using a low energy signal.

Embodiment 14

The system of any of embodiments 12-13, wherein the data further comprises a flag indicating a status of the entity.

Embodiment 15

The system of any of embodiments 12-14, wherein the private key is associated with a device identifier of the member device.

Embodiment 16

The system of any of embodiments 12-15, wherein the beacon continuously broadcasts the data over a predetermined range.

Embodiment 17

A computer-performed method for enabling discovery of a user by a member of an inner circle of the member when the user is in close proximity to the member, the method comprising: receiving an indication from a user device of members of an inner circle of the user device; and sending a private key associated with a mobile device to each of the corresponding members of the inner circle; the user device broadcasting an encrypted identifier that can be decrypted by the private key.

Embodiment 18

The method of embodiment 17, further comprising: receiving an indication from the user device that the members of the inner circle have changed; and transmitting a new private key to the members of the changed inner circle, wherein the new private key is used to decrypt the broadcast from the user device.

Embodiment 19

The method of any of embodiments 17-18, wherein a member device without a new private key cannot decrypt the encrypted identifier.

Embodiment 20

The method of any of embodiments 17-19, wherein the members of an inner circle are security checkpoints, and decrypting the identifier allows the user to be validated at the corresponding security checkpoint.

What is claimed is:

1. A system comprising:
   one or more processors; and
   computer storage memory having computer-executable instructions stored thereon which, when executed by the one or more processors, implement discovery of a member of an inner circle of an entity in close proximity to the entity, comprising:
   at a member device of the member of the inner circle:
      receiving a private key from an identification server, the private key for use in decrypting a user identifier;
      receiving broadcast data from a discoverable device indicating that the discoverable device is within a predetermined range of the member device, the broadcast data comprising an encrypted user identifier for the discoverable device and an unencrypted group identifier for the inner circle, wherein the encrypted user identifier is changed after a first predetermined period of time and the unencrypted group identifier is changed after a second predetermined period of time;
      decrypting the encrypted user identifier included in the broadcast data using the private key;
      based on decrypting the broadcast data using the private key, determining that the discoverable device is associated with the entity; and
      providing an alert indicating that the member device is proximate to the discoverable device associated with the entity.

2. The system of claim 1, wherein the broadcast data is broadcast using a low-energy signal.

3. The system of claim 1, wherein the broadcast data further comprises a flag indicating a status of the entity.

4. The system of claim 1, wherein a beacon continuously broadcasts the broadcast data over a predefined distance.

5. A computerized method comprising:
   at a member device associated with a member of an inner circle of an entity:
      receiving a private key that is configured to decrypt a user identifier;
      receiving broadcast data from a discoverable device indicating that the discoverable device is within a predetermined range of the member device, the broadcast data comprising an encrypted user identifier for the discoverable device and an unencrypted group identifier for the inner circle;
      decrypting the encrypted user identifier included in the broadcast data using the private key;
      based on decrypting the broadcast data, determining that the discoverable device is associated with the entity; and
      providing an alert indicating that the member device is proximate to the discoverable device associated with the entity.

6. The method of claim 5, wherein the private key is received from an identification server, wherein the identification server receives an update regarding members of the inner circle of the entity, the update comprising removing at least one member from the inner circle, and wherein based on the update, the identification server transmits a new private key to members of the inner circle, excluding the at least one member that has been removed.

7. The method of claim 5, wherein the private key is associated with a device identifier of the member device.

8. The method of claim 7, wherein the private key is unique to the member device.

9. The method of claim 5, wherein the private key is valid for decrypting the encrypted user identifier for a predetermined period of time.

10. The method of claim 5, wherein the private key is configured to decrypt only a particular user's encrypted user identifier.

11. The method of claim 5, wherein the private key is communicated over a first communication channel and the broadcast data is communicated over a second communication channel, wherein the first communication channel is different from the second communication channel.

12. The method of claim 5, wherein the encrypted user identifier is changed after a predetermined period of time.

13. The method of claim 12, wherein the predetermined period of time is a user-configurable parameter.

14. The method of claim 5, wherein the broadcast data further comprises a flag indicating a status of the entity, and wherein a busy status prevents the provision of the alert indicating that the member device is proximate to the discoverable device associated with the entity.

15. A system comprising:
one or more processors; and
one or more computer storage media storing computer-useable instructions that, when executed by the one or more processors, cause the one or more processors to perform operations comprising:
at a member device associated with a member of an inner circle of an entity:
receiving a private key that is configured to decrypt a user identifier;
receiving broadcast data from a discoverable device indicating that the discoverable device is within a predetermined range of the member device, the broadcast data comprising an encrypted user identifier for the discoverable device and an unencrypted group identifier for the inner circle;
decrypting the encrypted user identifier included in the broadcast data using the private key;
based on decrypting the broadcast data, determining that the discoverable device is associated with the entity; and
providing an alert indicating that the member device is proximate to the discoverable device associated with the entity.

16. The system of claim 15, wherein the private key is received from an identification server, wherein the identification server receives an update regarding members of the inner circle of the entity, wherein based on the update, the identification server transmits a new private key to current members of the inner circle, and wherein the new private key is configured to decrypt a new encrypted user identifier that is broadcast by the discoverable device.

17. The system of claim 16, wherein discovery of the discoverable device is restricted to current members of the inner circle having the new private key.

18. The system of claim 15, wherein the member of the inner circle is a security checkpoint, and wherein decrypting the encrypted user identifier facilitates validating the entity at the security checkpoint.

19. The system of claim 15, wherein the operations at the member device further comprise:
based on the unencrypted group identifier, determining that the member belongs to the inner circle of the entity; and
based on determining that the member belongs to the inner circle of the entity, decrypting the encrypted user identifier included in the broadcast data using the private key.

20. The method of claim 5, further comprising:
utilizing the unencrypted group identifier to determine membership of the inner circle of the entity; and
based on the determined membership, performing the decryption of the encrypted user identifier included in the broadcast data using the private key.

* * * * *